United States Patent [19]

Kleine

[11] Patent Number: 4,840,519

[45] Date of Patent: * Jun. 20, 1989

[54] DRILL BIT FOR HAND DRILLS

[75] Inventor: Werner Kleine, Achim, Fed. Rep. of Germany

[73] Assignee: Gebruder Heller GmbH. Werkzeugfabrik, Achim-Uphusen, Fed. Rep. of Germany

[*] Notice: The portion of the term of this patent subsequent to Oct. 27, 2004 has been disclaimed.

[21] Appl. No.: 65,944

[22] Filed: Jun. 24, 1987

Related U.S. Application Data

[63] Continuation of Ser. No. 684,031, Dec. 20, 1984, abandoned.

[30] Foreign Application Priority Data

Dec. 27, 1983 [DE] Fed. Rep. of Germany ... 8337365[U]
Apr. 10, 1984 [DE] Fed. Rep. of Germany ....... 3413432

[51] Int. Cl.⁴ .......................... B23B 31/04; B23B 51/02
[52] U.S. Cl. ...................... 408/226; 279/60; 279/123; 279/19; 408/240
[58] Field of Search ................. 408/226, 239, 239 A, 408/240; 409/234; 279/1 B, 1 DL, 60, 64, 65, 19, 19.4, 19.5, 19.7, 123

[56] References Cited

U.S. PATENT DOCUMENTS

| | | | |
|---|---|---|---|
| 3,333,490 | 8/1967 | Popin | 408/226 |
| 4,502,824 | 3/1985 | Dohse et al. | 409/234 |
| 4,536,109 | 8/1985 | Hunper et al. | 408/240 |
| 4,702,651 | 10/1987 | Kleine | 408/226 |

FOREIGN PATENT DOCUMENTS

| | | | |
|---|---|---|---|
| 2405938 | 8/1975 | Fed. Rep. of Germany | 279/19 |
| 3118691 | 2/1982 | Fed. Rep. of Germany | |
| 755622 | 8/1956 | United Kingdom | 408/226 |
| 2103988 | 3/1983 | United Kingdom | 279/19.5 |

Primary Examiner—Z. R. Bilinsky
Attorney, Agent, or Firm—Hopgood, Calimafde, Kalil, Blaustein & Judlowe

[57] ABSTRACT

The invention contemplates an improved drill-bit construction wherein the shank by which the bit is clamped is characterized by (a) three angularly spaced grooves which are continuous over their entire length of engageability to the jaws of a multi-jaw chuck, (b) at least one of the grooves being closed at its rear end, (c) the rear end of the closed-end groove is at no greater offset than 5-mm from the rear end of the bit, and (d) the diameter of the cutting part of the bit shank is greater than the diameter of the clamping part of the shank, to an extent which at most results from shaped formation of the chip-removal groove.

13 Claims, 2 Drawing Sheets

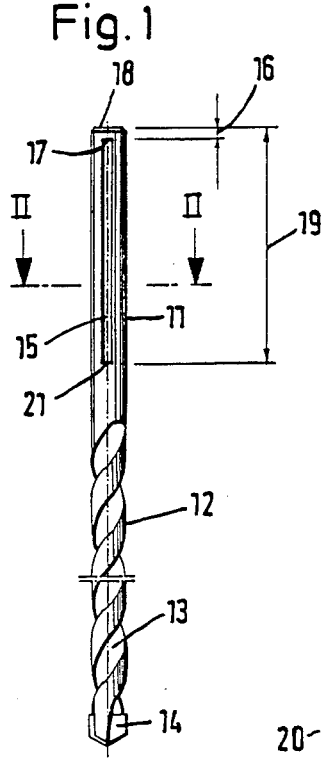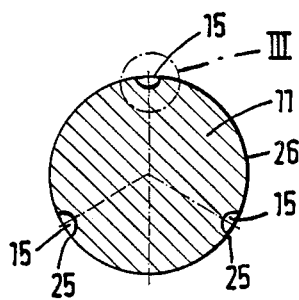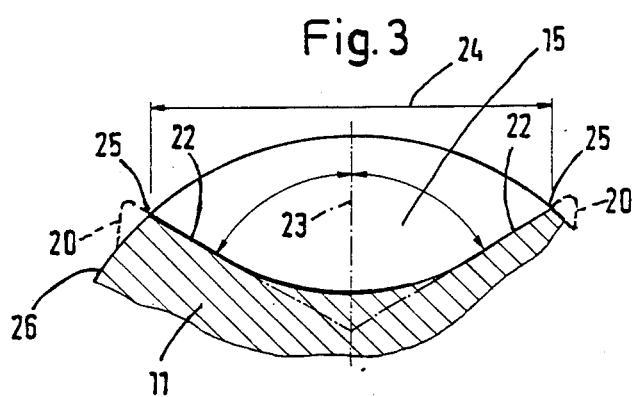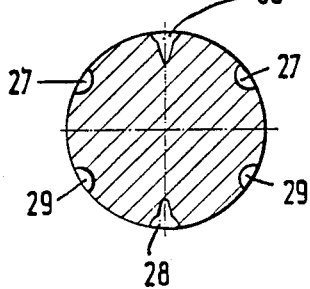

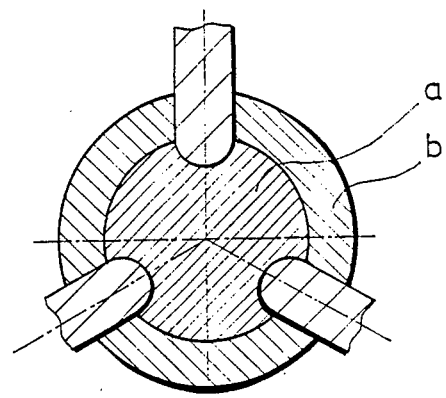
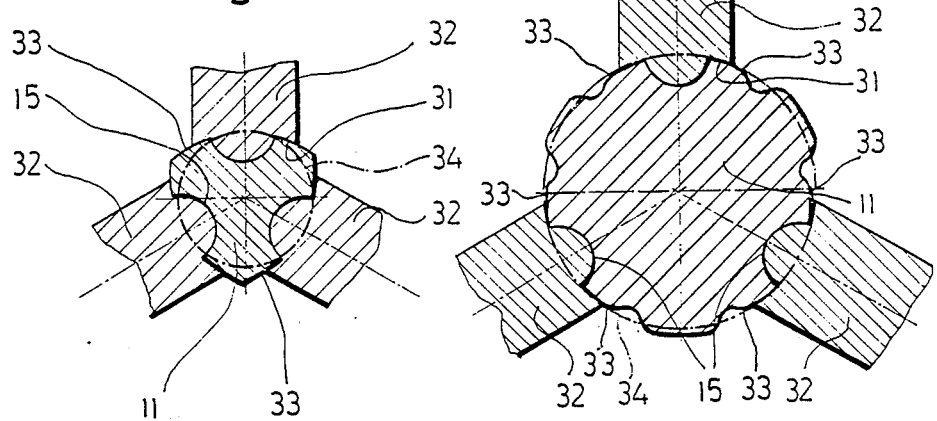
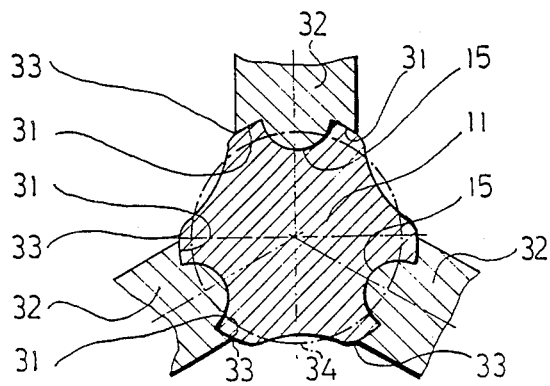

DRILL BIT FOR HAND DRILLS

This is a continuation of copending application Ser. No. 684,031, filed Dec. 20, 1984 now abandoned.

BACKGROUND OF THE INVENTION

The present invention concerns a drill bit for hand drills which has a clamping shank for attachment to a hand drill and a drill shank having at least one cutting edge and at least one chip-removal groove.

The known hand drills can be divided into three groups, namely into hammer drills, percussion drills and ordinary drills, their practical importance decreasing in the sequence indicated.

A hammer drill is a drill in which the bit is held within a tool holding fixture or chuck in such a manner that it is movable axially but is keyed for the transmission of the rotation of the holding fixture or chuck to the bit. In a hammer drill, an impact pin also known as hammer is provided which is moved axially back and forth and is adapted to exert blows on the rear end of the bit's clamping shank which is clamped in the holding fixture or chuck of the hammer drill.

In percussion drills, the chuck is attached to an axially movable spindle on which blows are exerted during the drilling so that the chuck is moved axially back and forth together with the bit, which is clamped firmly in it.

In ordinary drills, the bit is merely imparted a rotating movement so that the bit, which is clamped in the drill and rotates, must be pressed into the drill hole.

In the hammer drills which are customary on the market the tool-holding fixtures all have the same diameter, so that the bits for holes of different diameter must always have a clamping shank of the same diameter, which greatly increases the cost of manufacture of the bits.

As compared with this, percussion drills and ordinary drills have three-jaw chucks in which the chucks can be adapted to different diameters of the clamping shanks so that in the bits used in these drills the diameters of the cylindrical surface of the drill shank and of the clamping shank are substantially the same.

From Federal Republic of Germany OS No. 31 18 691 a hammer drill is known in which a multiple-jaw chuck, for instance a three-jaw chuck, can also be used for the clamping of the bit, so that it is possible to use in these hammer drills also bits in which the diameter of the bit shank and of the clamping shank is substantially the same.

For the keyed transmission of the torque from the tool-holding fixture or chuck to the bit it is known in the case of hammer drills to provide axially extending grooves in the clamping shank of the bit, driving parts of the chuck engaging in said grooves so that the bit, which is held with limited axial movement in the tool-holding fixture or chuck for the transmission of the blows to the place of drilling is driven along in keyed fashion by the engagement of the driving parts into the grooves upon the rotation of the chuck.

BRIEF STATEMENT OF THE INVENTION

The object of the present invention is to create a bit which is simple to manufacture and which can be used in all hand drills.

In Federal Republic of Germany Utility Model No. 81 32 988 a solution for this is proposed. In accordance therewith, the groove provided in the clamping shank is subdivided into longitudinal sections by at least one rib whose back corresponds to the contour of the clamping shank. By means of this rib a possibility for the supporting of the jaws of the chuck of a percussion drill is created so that an axially correct and dependable holding of the bit in percussion drills is assured.

However, this solution has the disadvantage that it fails to take into account the fact that the jaws of the multi-jaw chucks which are frequently used in percussion drills are in different axial positions upon adjustment to different diameters of the clamping shank of a bit and thus act on the clamping shank of the bit at different distances from its rear end. This has the result that in the case of certain drills of given diameters there is the possibility that the clamping jaw of a percussion drill will rest only against the rib and not against the rest of the surface of the clamping shank. As a result, in these cases—which are unavoidable in practice—the bit does not have a firm seat in the clamping shank.

In order to achieve the purpose indicated above, a method which differs from the solution in accordance with Federal Republic of Germany Utility Model No. 81 32 988 is employed in the present invention. The basic concept of the invention consists in developing the grooves in the clamping shank of the bit in such a manner that the jaws of a multi-jaw chuck of a percussion drill or of an ordinary drill as well as the driving parts of a hammer drill engage into the grooves.

This solution consists, according to the present invention, in the combination of the following features:

(a) the clamping shank is provided on each of at least three symmetrically arranged generatrices with an individual groove which is continuous over its entire length and serves for the engagement of the jaws of a multi-jaw chuck, (b) at least one of these three grooves is closed at its rear end, (c) the end of the groove which is closed at its rear end is at a distance of at most 5 mm from the rear end surface of the clamping shank, (d) the diameter of the bit shank is greater than the diameter of the clamping shank by at most the amount which results upon formation of the chip-removal groove by non-cutting shaping, and (e) all of the at-least three grooves have the same cross-section.

As a result of feature (b), the result is obtained that, in the case of hammer drills, the bits cannot be pushed out of the chuck despite the possible axial displacement, as long as the bit is clamped in the chuck.

As a result of feature (e), the result is obtained that minimum drill-bit rotation is needed for unambiguous jaw location in the respective grooves of the clamping shank, particularly when the number of jaws is equal to or a submultiple of the number of said at-least three grooves.

As a result of features (a) and (c) the result is obtained that not only the drives of the chuck of hammer drills but also the jaws of the multi-jaw chuck of percussion drills and ordinary drills can engage into the grooves. In this way, a very firm seat of the bit is assured in percussion drills and ordinary drills in the same way as in hammer drills. As a result of feature (a), furthermore, the advantage is obtained that in this way optimal conditions are created for the transfer of the torque from the chuck to the bit in the case of all hand drills.

In this connection, feature (b) affords the possibility that a bit which has seized fast in the drill hole drilled by it can be pulled out of the hole by means of the drill while it is still operating since the closed end of the groove prevents the pulling of the bit out of the chuck even in the case of percussion drills and ordinary drills, as otherwise can very easily be the case if, for instance, the chuck has opened up somewhat under the influence of the blows or the bit has seized fast in the hole.

Instead of only three grooves, grooves can be arranged on n groups of three symmetrically arranged generatrices of the clamping shank. In this case, n may be any desired whole number which in the case of only three grooves is 1 but otherwise is greater than 1. In order that at least one jaw engages into a groove which is closed at its rear end in each position of rotation of the drill in a three-jaw chuck, at least n generatrices, whose angular distances apart are other than 120°, can be closed at their rear ends. If n is greater than 1, then, upon wear of the grooves of one group of three grooves, another group of three can be used. Furthermore, the clamping of the bit is facilitated since for the engagement of the jaws into the grooves of the bit after insertion into the chuck it is merely necessary to turn at most through an angle of less than 60°.

In the traditional three-jaw chucks of percussion drills and ordinary drills, the jaws are developed as wedge sectors whose side surfaces form an angle of 120° with each other. In order to assure an accurately centered position of the bit in a three-jaw chuck, it is provided, in one advantageous embodiment, that the border or outer-edge surfaces of the groove flanks are flat and form an angle of about 60° with the imaginary diametral plane extending in the center between the groove surfaces and that the distances between the groove edges formed by the lines of intersection of the groove flanks and the cylindrical surface of the clamping shank are identical in the case of all grooves. In this way, the result is obtained that the jaws of the three-jaw chuck which engage into the grooves have their side surfaces resting fully against the flanks of the grooves and engage to the same depth into the grooves, so that a centered position of the bit shank in the chuck is assured. In the event that, in the future, the jaws of the multi-jaw chuck of hand drills should have a different shape, the shape of the groove can be adapted without difficulty to the shape of the jaw upon the manufacture of the bits.

In one preferred embodiment of the invention, it is provided that at least one of those edge surfaces of the clamping shank which adjoin the grooves has a course which differs from the cylindrical circumferential surface of the clamping-shank blank. This can be achieved, for instance, in the manner that the material which is displaced upon the non-cutting forming of the grooves is used in order that at least the edge surface which is the leading one upon the drilling forms a bead-like elevation of the cylindrical surface of the clamping shank, said bead-like elevation constituting substantially a continuation of the outer groove edge.

Surprisingly, this makes it possible to solve the following problem, which falls within the scope of the object of the invention.

In the multi-jaw chuck known from Federal Republic of Germany OS No. 31 18 691, flat guide surfaces are provided on both sides of the driving surfaces present on the jaws which cooperate with mating surfaces provided on the clamping shanks of the bits, said guide surfaces resting tangentially against the cylindrical outer surfaces of the clamping shanks. The preferred embodiment of the present invention enables flat development of the edge surfaces adjoining the grooves so as to match the flat guide surfaces of the jaw and thus obtain, instead of a line guidance, an area guidance of the bits in the multi-jaw chuck. In this connection, it is particularly advantageous that, in accordance with the invention, the edge surfaces, adjoining the grooves, of the clamping shanks of all drills can be adapted to any guide surfaces of the jaws in order to produce an area guidance in all bits, for instance if the guide surfaces of the jaws have a flat or cylindrical shape, which, of course, is retained for all adjustments.

DETAILED DESCRIPTION

Further features of the invention will become evident from the following description of embodiments shown in the drawing, in which:

FIG. 1 is a side view of one embodiment of a bit in accordance with the invention;

FIG. 2 is a cross section along the line II—II of FIG. 1;

FIG. 3 shows the portion III of FIG. 2 on a larger scale;

FIG. 4 is a section corresponding to FIG. 2 through a modified embodiment;

FIG. 5 is a diagrammatically simplified cross section through a known tool-holding fixture of a hammer drill with bit clamped therein;

FIGS. 6 to 8 are cross sections corresponding to FIG. 5 of the clamping shanks of bits of different diameter in accordance with the invention with jaws of the same multi-jaw chuck acting thereon.

The bit shown in FIG. 1 has a clamping shank 11 and a bit shank 12. The bit shank 12 is provided with two chip-removal grooves 13 and bears a cutting tip 14 at its front end.

The clamping shank 11, as can be noted from FIG. 2, is provided with three grooves 15 arranged symmetrically to the axis, these grooves, as shown in FIG. 1, being closed at the front and rear ends 21 and 17 respectively.

As can be noted from FIG. 1, the bit shown there consists of a single piece and is produced from a preferably cylindrical blank. In the case of formation of the chip-removal grooves 13 by non-cutting shaping the diameter of the bit shank 12 is increased somewhat as compared with the diameter of the clamping shank. As a result, the ranges of diameter of the clamping shank which are indicated in the following table result for drills having the rated diameters of the hole to be drilled indicated in the table.

| Rated diameter of the drill hole mm | Range of diameter of the clamping shank mm |
| --- | --- |
| 5 | 3.5 to 5 |
| 6 | 4.5 to 6 |
| 6.5 | 5.0 to 6.5 |
| 7 | 5.3 to 7 |
| 8 | 6.2 to 8 |
| 10 | 7.7 to 10 |
| 12 | 8.8 to 12 |
| 13 | 9 to 13 |
| 14 | 9.5 to 14 |

In the case of all the bits listed in the above table the distance 16 from the rear end 17 of the groove 15 to the rear end surface 18 is at most 5 mm, and preferably less than 3.5 mm. The distance 19 from the front end 21 of the groove 15 to the rear end surface 18 is at least 40 mm, and preferably at least 45 mm, in the case of all bits.

The outer edges 22 (see FIG. 3) of the flanks of the grooves 15 are flat and form an angle of about 60° with the imaginary diametral plane 23 extending in the center between the groove flanks. Furthermore, the spacing 24 of the edges 25 of the grooves is identical in the case of all grooves, so that into all three grooves of a bit there engage with equal depth the jaws of a three-jaw chuck, which commercially have the shape of a wedge sector whose side surfaces form an angle of 120° with each other and thus each form an angle of 60° with the central diametral plane between them.

As shown in dashed line in FIG. 3, the surface of the clamping shank 11 can have a bead-like elevation 20 of the cylindrical surface 26 of the clamping shank 11. This elevation 20 can, for instance, be formed, in the case of the formation of the grooves 15 by non-cutting shaping, from the material which is displaced upon the shaping and it forms substantially a continuation of the outer groove edges 22 so that in this way the surface of application against the corresponding jaw of the chuck, which surface carries the bit along upon rotation during the drilling, is increased. This is of particular advantage in the case of thin bits, since in this way the depth of groove, which weakens the driver shank, can be reduced without impairing the driving of the bit.

In FIG. 5 it is shown that in the known bits with the same clamping shank a for all bit diameters, the cylindrical inner wall of the tool-holding fixture b forms an area guidance for the bit.

FIGS. 6, 7 and 8 show that such guidance can be obtained by any desired, for instance cylindrical, guide surface 31 on the jaws 32 of a three-jaw chuck if the edge surfaces 33 of the clamping shanks 11 which adjoin the grooves 15 have a course which differs from the cylindrical circumferential surface 34 of the clamping-shank blank, namely a course which is the same in the case of all bits, for instance an identical cylindrical course which is adapted to the course of the, for instance, cylindrical guide surface 31 of the jaws 32, whose radius of curvature does not change upon the different adjustments of the jaws.

In the embodiment shown in FIG. 4, two groups are provided consisting of three symmetrically arranged grooves 27, 28 in the one case, and 29, 30 in the other case. Two grooves 28 and 30 are deeper than the other grooves 27 and 29, which may be advantageous when the bit is used in a hammer drill if the chuck of the hammer drill has special drivers for engagement into the deeper grooves 28 and 30. As can be noted from FIG. 4, the angular distance between the grooves 28 and 30 is different from, namely greater than, 120°. In this way, the result is obtained that the grooves 28 and 30 belong to different groups of three symmetrically arranged grooves.

FIG. 4 shows an embodiment with two groups of three grooves. The number of three-groove groups may, however, be any desired. Nor is it necessary for the groups of three grooves to be arranged symmetrically to each other, as shown in FIG. 4.

In the embodiments shown, all grooves 15 are closed at their front and rear ends 21 and 18 respectively. However, it is sufficient if only one groove of each group of three grooves 15 or 27, 28 or 29, 30 is closed at its rear end, for instance one of the grooves 15 and, in the case of the embodiment of FIG. 4, preferably the grooves 28 and 30.

In another embodiment (not shown), individual or all grooves 15, 27, 28, 29 or 30 can be continued to the chip-removal groove 13.

In principle, the shape of the groove should be adapted, insofar as possible, to the shape of the jaws of the chuck of the drills so that area contact is assured between the jaws and the walls of the grooves. The groove wall may possibly be bent circularly in cross section. Furthermore, for instance, the outer edges 22 of the groove flanks of a groove can form with each other an angle which is different from 120° and, for instance, amounts to only about 90°.

I claim:

1. A set of drill bits of different thickness, wherein each drill bit has a drill shank and a clamping shank which has a longitudinal axis and a circumferential surface, and wherein the circumferential surface of one drill bit is larger than the circumferential surface of another drill bit, the circumferential surface of each drill bit being interrupted by at least two angularly spaced and generally longitudinally extending grooves, each of said circumferential surfaces having at least one formation which adjoins each of said grooves, each said formation being a surface other than concentric about the longitudinal axis of the involved drill bit, and the sectional profile of each groove and its associated formation surface being identical for all drill bits of said set.

2. A drill bit for hand drills, said bit having a drill shank and a clamping shank which has a longitudinal axis and a circumferential surface, said circumferential surface being interrupted by at least two angularly spaced and generally longitudinally extending grooves, each of said grooves being symmetrical about a geometric plane which includes said longitudinal axis, said circumferential surface having at least one formation which adjoins each of said grooves, said at least one formation for each groove being a surface which is cylindrical about an axis which is parallel to and eccentrically offset from said longitudinal axis and which is in the geometric plane of symmetry of the involved groove.

3. A drill bit of metal for hand drills, said bit having a drill shank and a clamping shank which has a longitudinal axis and a generally circumferential surface which is characterized by displaced-metal formations, said circumferential surface being interrupted by at least two angularly spaced and generally longitudinally extending indented groove formations, said circumferential surface having at least one outwardly displaced formation which adjoins each of said grooves, said formations being surfaces which are other than cylindrical about said longitudinal axis, and at least one of said grooves terminating of the clamping shank end of said drill bit.

4. A drill bit according to claim 3, wherein each of said formation surfaces is an arcuate portion of a geometric cylinder having an axis parallel to but eccentrically offset from the longitudinal axis of the drill bit.

5. A drill bit according to claim 3 or claim 4, wherein said clamping shank has an outer surface which is, at least in circumferentially distributed regions, cylindrical about the longitudinal axis of the drill bit, and wherein said formation surfaces extend radially beyond the geometrical cylinder of said regions.

6. A drill bit according to claim 2 or claim 4, in which the number of said grooves is three.

7. A drill bit according to claim 2 or claim 3, wherein the drill bit is one of a plurality of drill bits of different shank size, said grooves and adjoining formation surfaces being of the same plurality, angular spacing and local cross-section for each of the shank sizes of said plurality.

8. A drill bit according to claim 3, in which said formation surface is flat for each of said grooves.

9. A set of drill bits of different thickness, wherein each bit has a drill shank and a clamping shank which has a longitudinal axis and a circumferential surface, and wherein the circumferential surface of one drill bit is larger than the circumferential surface of another drill bit, the circumferential surface of each drill bit being interrupted by at least two angularly spaced and generally longitudinally extending grooves, each of said grooves being symmetrical about a geometric plane which includes said longitudinal axis, each of said circumferential surfaces having at least one formation which adjoins each of said grooves, said at least one formation for each groove being a surface that is cylindrical about an axis (a) which is parallel to and eccentrically offset from the longitudinal axis of the involved drill bit and (b) which is in the geometric plane of symmetry of the involved groove, the radius of all said cylindrical formation surfaces being the same.

10. The drill bit of claim 9, wherein the number of cylindrical-surface formations for each groove is two.

11. A set of hand-drill bits of metal of different thickness, wherein each drill bit has a drill shank and a clamping shank which has a longitudinal axis and a generally circumferential surface which is characterized by displaced metal formations, and wherein the circumferential surface of one drill bit is larger than the circumferential surface of another drill bit, the circumferential surface of each drill bit being interrupted by at least two angularly spaced and generally longitudinally extending indented groove formations, each of said circumferential surfaces having outwardly displaced formations which adjoin each of said grooves, said formations for each groove being surfaces other than cylindrical about said longitudinal axis, the sectional profile of each groove and its associated formation surfaces being identical for all drill bits of said set, and at least one of said grooves of each drill bit terminating short of the clamping-shank end of the involved drill bit.

12. A drill-bit set according to claim 11, in which said surfaces of said formations are flat.

13. A drill-bit set according to claim 1 or claim 9 or claim 11, in which the number of grooves in each drill bit is three.

* * * * *